(12) United States Patent
Gebhardt (10) Patent No.: US 12,084,311 B2
(45) Date of Patent: *Sep. 10, 2024

(54) ELEVATOR MOUNTING ASSEMBLY WITH SIDE MOUNT HANGER

(71) Applicant: InPro Corporation, Muskego, WI (US)

(72) Inventor: David R. Gebhardt, Milwaukee, WI (US)

(73) Assignee: InPro Corporation, Muskego, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,341

(22) Filed: Sep. 14, 2023

(65) Prior Publication Data

US 2024/0076165 A1 Mar. 7, 2024

Related U.S. Application Data

(63) Continuation of application No. 17/902,523, filed on Sep. 2, 2022, now Pat. No. 11,787,664.

(51) Int. Cl.
*B66B 11/02* (2006.01)
*F16M 13/02* (2006.01)

(52) U.S. Cl.
CPC ......... *B66B 11/0226* (2013.01); *F16M 13/02* (2013.01)

(58) Field of Classification Search
CPC . B66B 11/0226; B66B 11/0253; F16M 13/02; F16B 12/20; F16B 21/09
See application file for complete search history.

(56) References Cited

U.S. PATENT DOCUMENTS

| | | | | |
|---|---|---|---|---|
| 3,491,820 A | * | 1/1970 | Ostling | F16B 21/09 |
| | | | | 248/225.11 |
| 3,894,377 A | * | 7/1975 | Welch | F16B 12/22 |
| | | | | 52/584.1 |
| 4,470,716 A | * | 9/1984 | Welch | F16B 12/38 |
| | | | | 248/221.12 |

FOREIGN PATENT DOCUMENTS

| | | | | |
|---|---|---|---|---|
| CN | 205187554 | | 4/2016 | |
| CN | 205187554 U | * | 4/2016 | |
| CN | 107178170 | | 9/2017 | |
| CN | 107178170 A | * | 9/2017 | ............ E04B 9/065 |
| CN | 112875473 | | 6/2021 | |
| CN | 112875473 A | * | 6/2021 | ............ B66B 13/08 |

* cited by examiner

*Primary Examiner* — Diem M Tran
(74) *Attorney, Agent, or Firm* — Reinhart Boerner Van Deuren s.c.

(57) ABSTRACT

Embodiments of an elevator mounting assembly are provided. The elevator mounting assembly includes an elevator wall panel that is coupled to an elevator car wall by a hanger, specifically a side mount hanger. The hanger includes a lower wall that is spaced laterally apart from the elevator wall panel. At least a portion of the lower wall is in lateral alignment with the elevator wall panel. An intermediate wall extends from the lower wall in a direction toward the elevator car wall. Further, an upper wall extends from the intermediate wall, such that the upper wall is positioned nearer than the lower wall to the elevator car wall. The upper wall is coupled to the elevator car wall at a location above the elevator wall panel. Additionally, an elevator ceiling panel is coupled to the lower wall. In specific embodiments, the upper wall includes a plurality of wall mounting channels.

28 Claims, 8 Drawing Sheets

ELEVATOR MOUNTING ASSEMBLY WITH SIDE MOUNT HANGER

CROSS-REFERENCE TO RELATED PATENT APPLICATIONS

The application is a continuation of U.S. patent application Ser. No. 17/902,523, filed Sep. 2, 2022, the content of which is incorporated herein by reference in its entirety.

BACKGROUND OF THE INVENTION

The present invention relates generally to the field of elevator mounts. The invention relates specifically to an elevator mounting assembly for mounting an elevator ceiling panel to an elevator car wall.

SUMMARY OF THE INVENTION

One embodiment of the invention relates to a side mount hanger configured to mount an elevator ceiling panel to an elevator car wall. The side mount hanger includes an upper wall configured to mount to the elevator car wall. A lower wall is positioned at a lower vertical height than the upper wall. An intermediate wall is coupled to the upper wall and to the lower wall. The intermediate wall extends laterally between the upper wall and the lower wall. A ceiling mounting channel is formed in the lower wall and the intermediate wall. The ceiling mounting channel is configured to receive a ceiling mounting fastener that is coupled to the elevator ceiling panel. A plurality of horizontal mounting channels are formed in the upper wall. Each horizontal mounting channel is configured to receive a wall mounting fastener that couples the upper wall to the elevator car wall when the elevator ceiling panel is mounted to the elevator car wall. A vertical mounting channel is formed in the upper wall and the intermediate wall. The vertical mounting channel intersects at least one of the plurality of horizontal mounting channels. Additionally, the vertical mounting channel is configured to receive a wall mounting fastener that couples the upper wall to the elevator car wall when the elevator ceiling panel is mounted to the elevator car wall.

Another specific embodiment of the invention relates to a side mount hanger configured to mount an elevator ceiling panel to an elevator car wall. The side mount hanger includes a first wall and a second wall configured to be mounted to the elevator car wall by a wall mounting fastener. The second wall extends in a first direction away from the first wall such that the second wall is oriented perpendicularly to the first wall. Additionally, the second wall includes a wall mounting channel that is configured to receive the wall mounting fastener and to allow sliding of the wall mounting fastener with respect to the wall mounting channel when the second wall is mounted to the elevator car wall. The side mount hanger also includes a third wall that extends away from the first wall in a second direction opposite the first direction at a location spaced laterally apart from the location at which the second wall extends from the first wall such that the third wall is oriented perpendicularly to the first wall. The third wall includes a ceiling mounting channel that allows the elevator ceiling panel to be mounted to the third wall.

Yet another specific embodiment relates to an elevator mounting assembly that includes an elevator wall panel coupled to an elevator car wall. A hanger is coupled to the elevator car wall. The hanger includes a lower wall spaced laterally apart from the elevator wall panel. At least a portion of the lower wall is in lateral alignment with the elevator wall panel. An intermediate wall extends from the lower wall in a direction toward the elevator car wall. Additionally, an upper wall extends from the intermediate wall. The upper wall is positioned nearer than the lower wall to the elevator car wall and is coupled to the elevator car wall at a location above the elevator wall panel. Further, an elevator ceiling panel is coupled to the lower wall.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present invention is not limited to the details or methodology set forth in the description or illustrated in the figures. It should also be understood that the terminology is for the purpose of description only and should not be regarded as limiting.

Throughout the life of an elevator car, the elevator wall panels are commonly removed and replaced at a faster rate than the ceiling panels. In contrast to ceiling panels, that are generally aesthetically plain and positioned out of reach and direct sight line of a typical elevator car user, elevator wall panels receive more contact that can result in wear or damage and reflect more of an aesthetic presentation. As such, a building undergoing elevator car renovations may seek to replace the wall panels of the car to reflect current aesthetic trends or to replace worn or damaged panels while maintaining the same ceiling panels within the car. Applicant has found that an elevator mounting assembly that mounts the ceiling panel directly to the elevator car wall, while also providing sufficient lateral clearance between the ceiling panel and the upper wall panel, allows access to the upper wall for removal and replacement during elevator car renovations without forcing the renovator to first remove the ceiling panels. Additionally, when first assembling an elevator car, such an assembly permits the ceiling panels to be hung prior to the wall panels, which avoids the risk of damaging the new wall panels during the ceiling installation process.

Additionally, elevator car walls undergo small movements such as bowing, through use over time. As such, a ceiling panel that is rigidly connected to multiple locations of an elevator car wall can generate wear or damage to the elevator car wall. Applicant has found the risk of such damage to be reduced by mounting the ceiling panel to the elevator car wall with a hanger that includes mounting channels, specifically horizontal mounting channels. Such mounting channels allow the fastener that couples the hanger to the elevator car wall to slide within the channel, even after the ceiling installation is complete. Applicant has further found the allowability of such sliding motion to decrease ceiling panel installation times by decreasing the required level of precision when aligning the mounting locations for a given ceiling panel about the elevator car.

Figure 1:
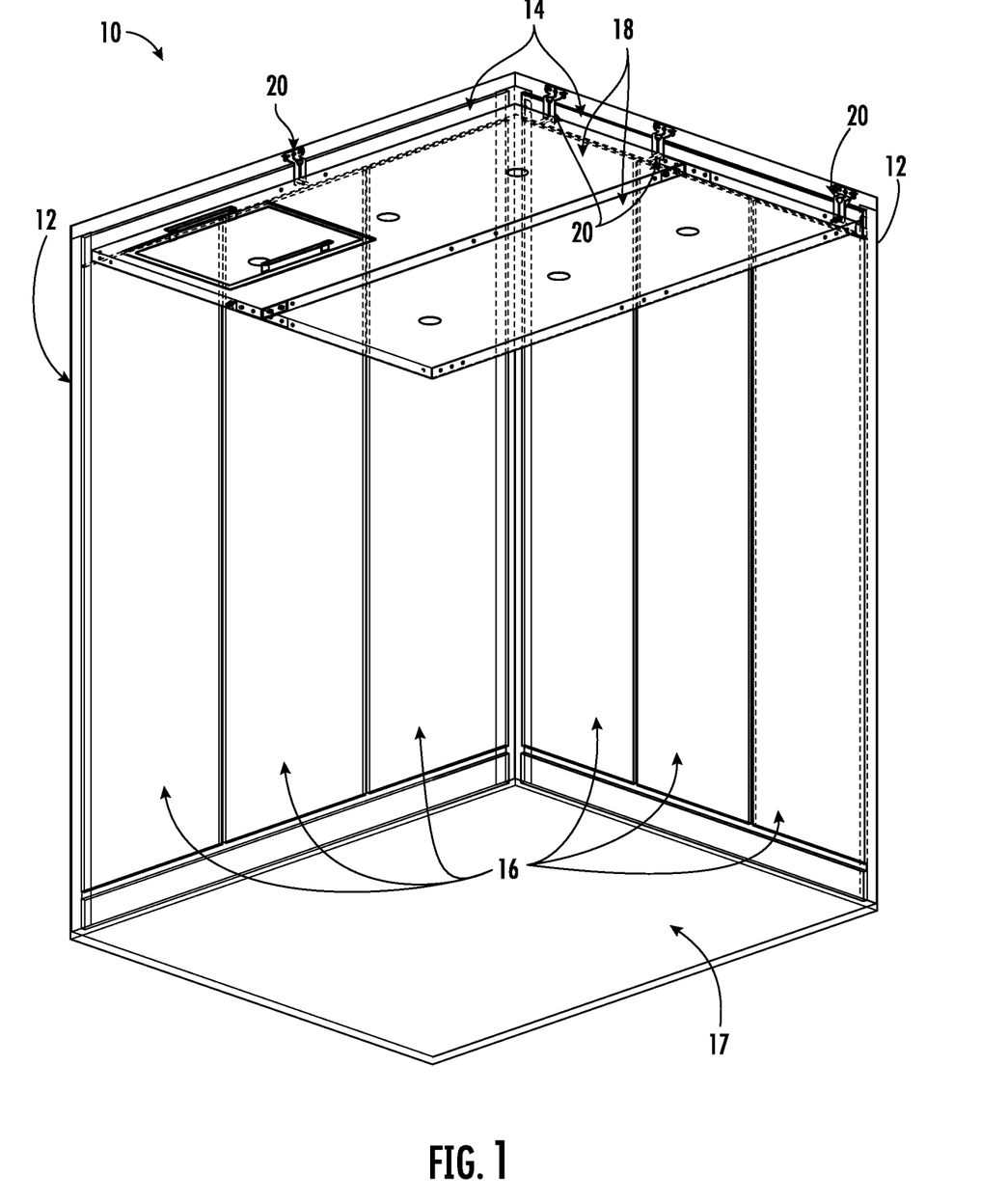
FIG. 1 is a perspective view from the front of an elevator car with mounted ceiling panels, shown with two of the elevator car walls removed, according to an exemplary embodiment.

Referring to FIG. 1, an elevator car 10 is shown with two of the elevator car walls removed to show the two remaining elevator car walls 12 more clearly. Each elevator car wall 12 includes a plurality of lower elevator wall panels 16 and at least one upper wall panel 14 positioned above the lower elevator wall panels 16. Additionally, two ceiling panels are shown mounted to the elevator car walls 12 opposite an elevator floor 17. Each ceiling panel 18 is mounted to elevator car walls 12 by hangers 20. In specific embodiments, hanger 20 is a side mount hanger.

Figure 2:
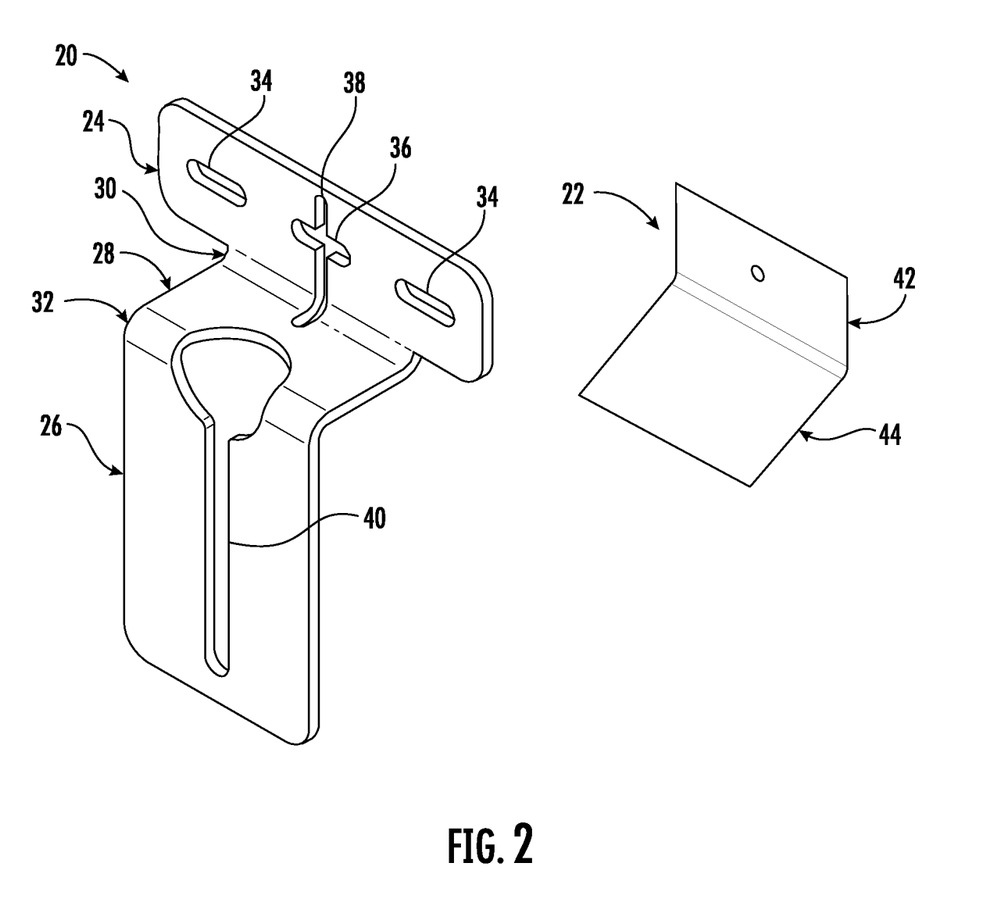
FIG. 2 is an exploded perspective view of a side mount hanger and security clip, according to an exemplary embodiment.

Referring to FIG. 2, hanger 20 is shown in greater detail. Hanger 20 includes an upper wall 24 that is configured to mount to elevator car wall 12. Upper wall 24 includes horizontal mounting channels 34 and 36, otherwise known as slotted mounting channels. In specific embodiments, two outer horizontal mounting channels 34 are formed in upper wall 24 and one inner horizontal mounting channel 36 is formed in upper wall 24 between the two outer horizontal mounting channels 34. Specifically, inner horizontal mounting channel 36 is horizontally centered with respect to upper wall 24. As shown in FIG. 2, horizontal mounting channels 34 and 36 are arranged in horizontal alignment with one another. As further shown in FIG. 2, a vertical mounting channel 38 intersects, specifically horizontally bisects, inner horizontal mounting channel 36. Mounting channels, specifically wall mounting channels 34, 36, and 38 are respectively configured to receive wall mounting fasteners that couple upper wall 24 to elevator car wall 12.

Hanger 20 further includes a lower wall 26. In specific embodiments, lower wall 26 is positioned at a lower vertical height than upper wall 24, specifically at a height lower than the height at which upper wall 24 is positioned in the vertical direction. Lower wall 26 includes a ceiling mounting channel 40 that allows the elevator ceiling panel 18 to be mounted to lower wall 26. Specifically, ceiling mounting channel 40 is configured to receive a ceiling mounting fastener that couples ceiling panel 18 to lower wall 26.

Hanger 20 further includes an intermediate wall 28 that is coupled to both upper wall 24 and lower wall 26. In specific embodiments, intermediate wall 28 extends laterally between upper wall 24 and lower wall 26. Additionally, as shown in FIG. 2, upper wall 24 extends in a first direction, specifically an upward vertical direction, away from intermediate wall 28, such that upper wall 24 is oriented perpendicularly to intermediate wall 28, and lower wall 26 extends in a second direction opposite the first direction, specifically a downward vertical direction, such that lower wall 26 is oriented perpendicularly to intermediate wall 28.

In specific embodiments, upper wall 24 is coupled to intermediate wall 28 by corner wall segment 30, specifically an upward opening arcuate wall segment. Additionally, lower wall 26 is coupled to intermediate wall 28 by a corner wall segment 32, specifically a downward opening arcuate wall segment. As shown in FIG. 2, in specific embodiments, ceiling mounting channel 40 is formed in both lower wall 26 and intermediate wall 28, and likewise extends across corner wall segment 32, which provides for a larger opening at an upper end of the channel to receive the head of the ceiling mounting fastener. Further, in specific embodiments, vertical mounting channel 38 is formed in both upper wall 24 and intermediate wall 28, and likewise extends across corner wall segment 30, which increases the structural support provided by hanger 20. In specific embodiments, as shown in FIG. 2, hanger 20 defines an integrally formed structure. Specifically, upper wall 24, lower wall 26, intermediate wall 28 and arcuate wall segments 30 and 32 are integrally formed together during the formation of hanger 20.

FIG. 2 additionally shows a security clip 22. In specific embodiments, security clip 22 is positioned behind hanger 20 (as shown in the partially assembled view illustrated in FIG. 4) to add structural support to hanger 20. As shown in FIG. 2, security clip 22 includes an upper clip wall 42 that is positioned behind upper wall 24 of hanger 20. Upper clip wall 42 is coupled to a lower clip wall 44 that extends from upper clip wall 42 toward lower wall 26 of hanger 20.

Figure 3:
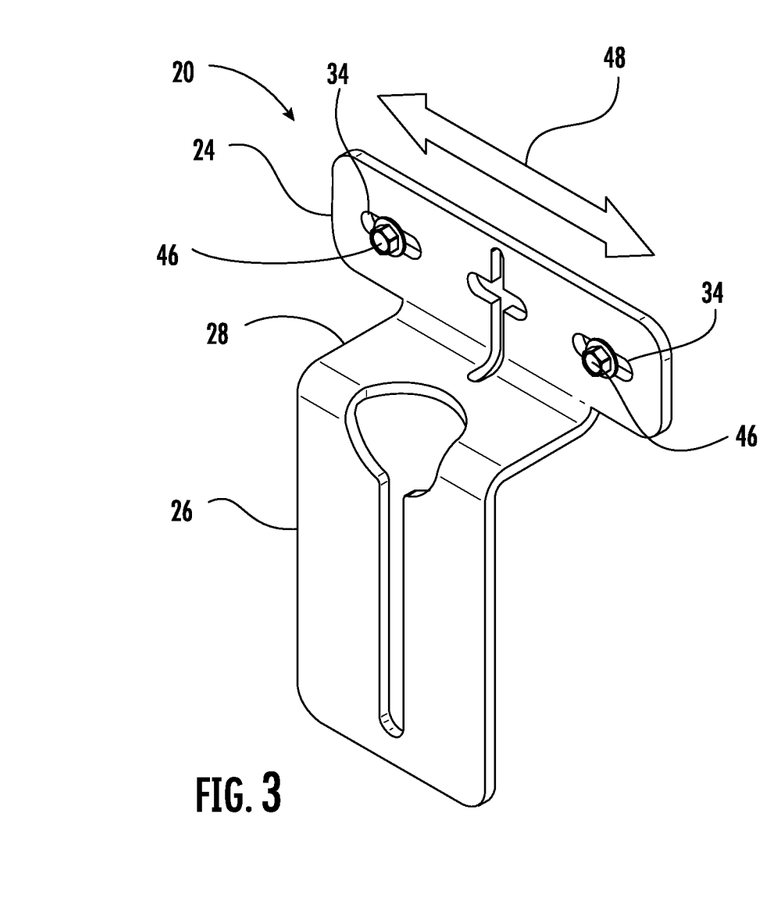
FIG. 3 is a perspective view of the side mount hanger shown in FIG. 2, with two inserted fasteners, according to an exemplary embodiment.
Figure 4:
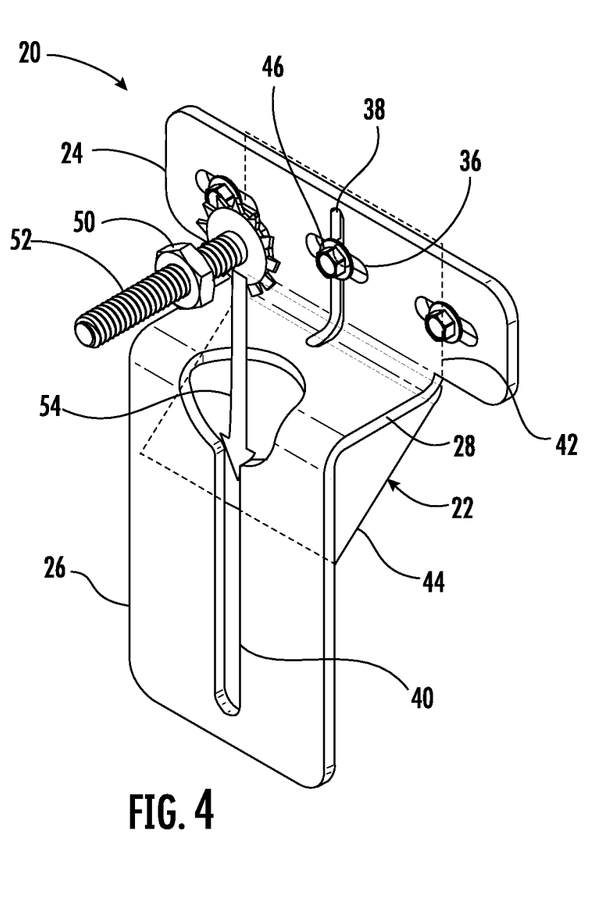
FIG. 4 is a perspective view of the side mount hanger and security clip shown in FIG. 2, with three inserted fasteners and a fourth fastener being inserted into the hanger, according to an exemplary embodiment.

Referring to FIG. 3, hanger 20 is shown with wall mounting fasteners 46 inserted within outer horizontal mounting channels 34 of upper wall 24. During installation, hanger 20 is allowed to slide back and forth in the horizontal direction, as indicated by arrow markers 48, even after wall mounting fasteners 46 have vertically and laterally secured upper wall 24 to elevator car wall 12. Referring to FIG. 4, after wall mounting fasteners 46 have been fastened within outer horizontal mounting channels 34, upper clip wall 42 of security clip 22 is slid behind upper wall 24 of hanger 20 and secured in place between upper wall 24 and elevator car wall 12 by a third wall mounting fastener 46. In specific embodiments, wall mounting fasteners 46 are threaded fasteners or screws. Finally, a ceiling mounting fastener 52 is inserted in a downward vertical direction, as indicated by arrow marker 54, into ceiling mounting channel 40 and past lower clip wall 44 of security clip 22. In specific embodiments, ceiling mounting fastener 52 is a threaded fastener, such as a hex screw, and is secured to hanger 20 by hex nut 50. Though ceiling panel 18 is not shown in FIG. 4, in order to show the remaining components more clearly, during assembly, ceiling panel 18 would be secured to ceiling mounting fastener 52 at the time ceiling mounting fastener 52 is inserted into ceiling mounting channel 40 (for example, as shown in FIGS. 8-13).

Figure 5:
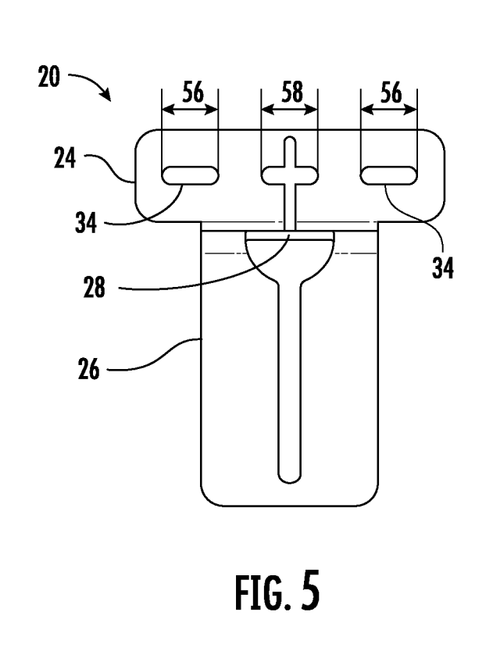
FIG. 5 is a front view of the side mount hanger shown in FIG. 2, according to an exemplary embodiment.

Referring to FIG. 5, a front view is shown of hanger 20. As shown in FIG. 5, the length 56 of each outer horizontal mounting channel 34 is approximately ¼" to 1½." In certain specific embodiments, the length 56 is ¼." As such, during installation, hanger 20 is allowed approximately ¼" of horizontal movement when aligning hanger 20 to other hangers 20 at other mounting locations around the elevator car walls 12 in order to hang ceiling panel 18. In some embodiments, the length of inner horizontal mounting channel 36 is greater than or equal to the length of each respective outer horizontal mounting channel 34. As shown in FIG. 5, the length 58 of inner horizontal mounting channel 36 is less than the length 56 of each respective outer horizontal mounting channel 34. In specific embodiments, length 58 is approximately ¾."

Figure 6:
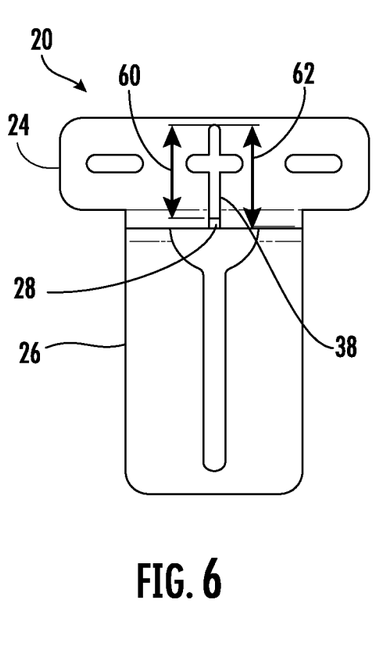
FIG. 6 is a rear view of the side mount hanger shown in FIG. 2, according to an exemplary embodiment.
Figure 7:
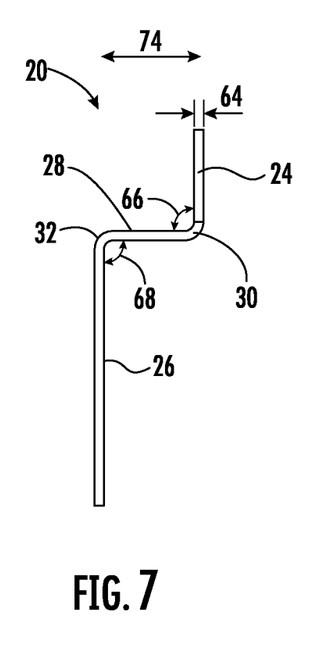
FIG. 7 is a side view of the side mount hanger shown in FIG. 2, according to an exemplary embodiment.

Referring to FIG. 6, a rear view is shown of hanger 20. As shown in FIG. 6, vertical mounting channel 38, extends a vertical height 62, and a vertical clearance 60 is provided from the top of vertical mounting channel 38 to the intermediate wall 28. In specific embodiments, vertical height 62 is approximately 1," and vertical clearance 60 is approximately ½" to 1¼." Further, referring to FIG. 7, a side view is shown of hanger 20. As shown in FIG. 7, lower wall 26 is spaced laterally apart from upper wall 24, specifically spaced apart from lower wall 26 in the lateral direction, as indicated by arrow markers 74. Additionally, lower wall 26 is positioned at a vertical height below the vertical height at which upper wall 24 is positioned. As shown in FIG. 7, an angle 66 is formed between upper wall 24 and intermediate wall 28, and an angle 68 is formed between lower wall 26 and intermediate wall 28. In specific embodiments, angle 66 is the same as angle 68. As shown in FIG. 7, angle 66 and angle 68 are each 90 degrees. Further, as shown in FIG. 7, hanger 20 has a thickness 64. In specific embodiments thickness 64 is approximately ⅛."

Figure 8:
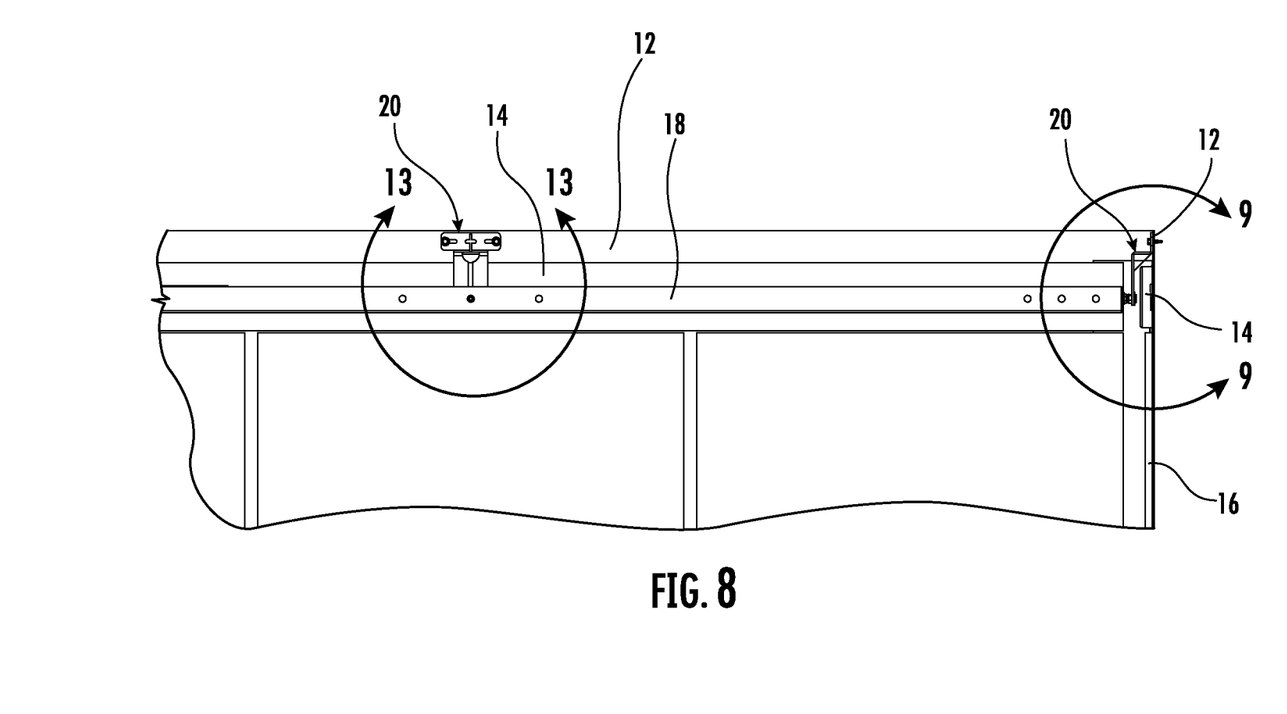
FIG. 8 is a front view of an upper portion of the elevator car shown in FIG. 1, according to an exemplary embodiment.

FIG. 8 shows an upper portion of the elevator car shown in FIG. 1, showing both front and side views of hangers 20 mounted on different elevator car walls 12 and supporting ceiling panel 18. As shown in FIG. 8, on each elevator car wall 12, an upper wall panel 14 is coupled to elevator car wall 12 in a position between elevator car wall 12 and hanger 20.

Figure 9:
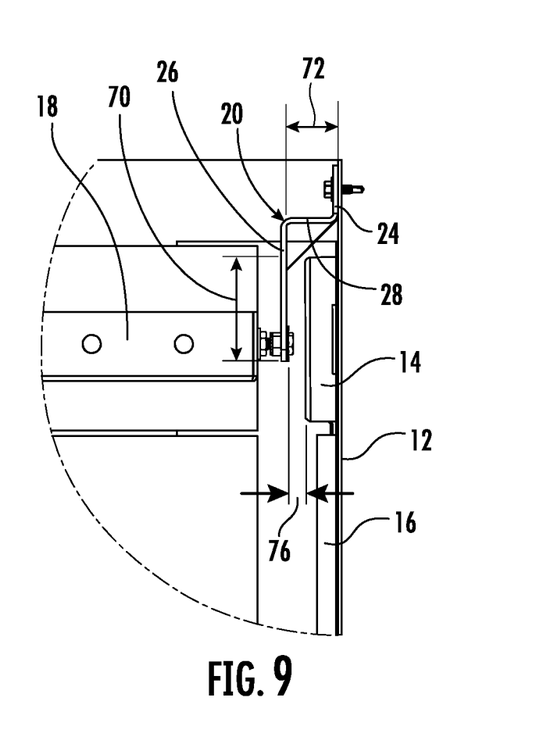
FIG. 9 is a detailed side view of an elevator mounting assembly, showing detail 9-9 of FIG. 8, according to an exemplary embodiment.

FIG. 9 shows section 9-9 of FIG. 8, specifically a side view detail of an elevator mounting assembly, as upper wall panel 14 is dismounted from elevator car wall 12. Referring to FIG. 9, upper wall panel 14 is shown coupled to elevator car wall 12. Hanger 20, specifically upper wall 24 of hanger 20, is also coupled to elevator car wall 12 at a location above upper wall panel 14. When hanger 20 is coupled to elevator car wall 12, lower wall 26 is spaced apart from elevator car wall 12 by a lateral distance 72. In specific embodiments, lateral distance 72 is approximately 1¾" to 3." Further, in specific embodiments, at least a portion 70 of lower wall 26 is in lateral alignment with upper wall panel 14. As shown in FIG. 9, lateral clearance is provided between lower wall 26 and upper wall panel 14. Specifically, upper wall panel 14 is spaced apart from upper wall panel 14 by a lateral distance 76. In specific embodiments, lateral distance 76 is approximately ¼" to 1½."

Figure 10:
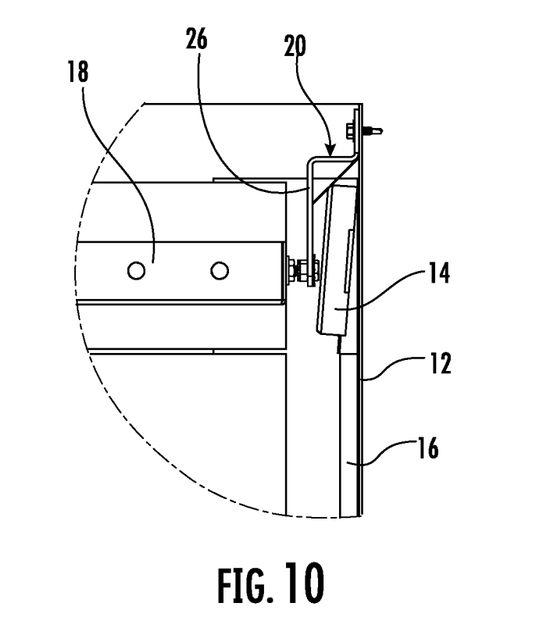
FIG. 10 is a detailed side view of the elevator mounting assembly shown in FIG. 9, with the upper elevator wall panel partially removed, according to an exemplary embodiment.
Figure 11:
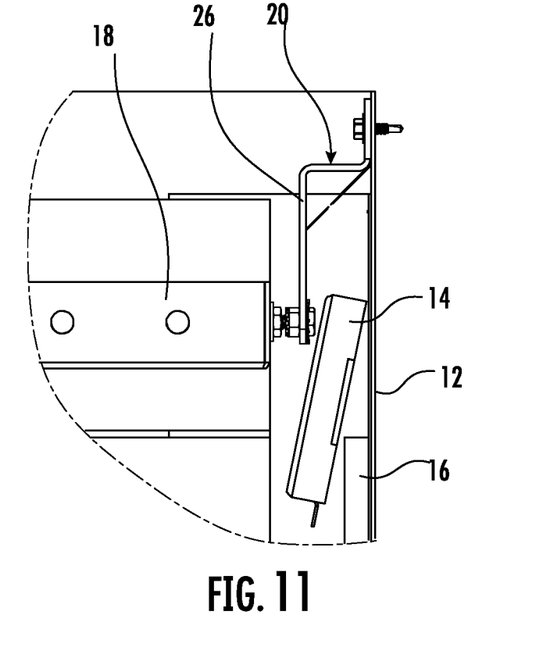
FIG. 11 is another detailed side view of the elevator mounting assembly shown in FIG. 9, with the upper elevator wall panel partially removed, according to an exemplary embodiment.
Figure 12:
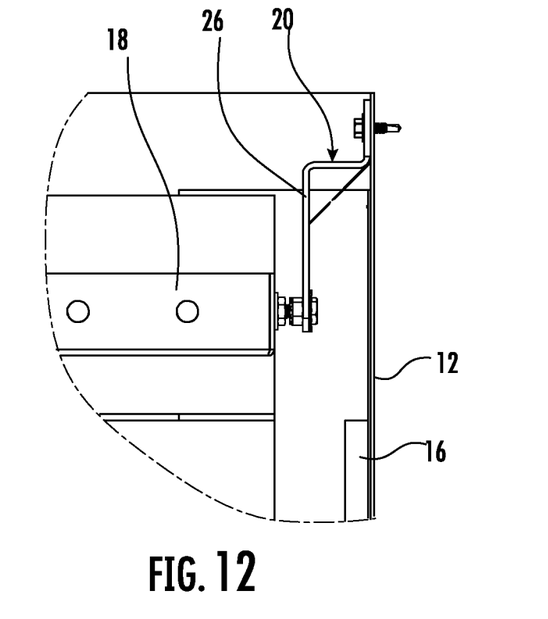
FIG. 12 is a detailed side view of the elevator mounting assembly shown in FIG. 9, with the upper elevator wall panel completely removed, according to an exemplary embodiment.

Further, intermediate wall 28 extends from lower wall 26 in a direction toward elevator car wall 12 and upper wall 24, as upper wall 24 is positioned nearer than lower wall 26 to elevator car wall 12. As shown in FIG. 9, upper wall 24 is positioned proximate to elevator car wall 12 when coupled to elevator car wall 12. Referring to FIGS. 10 and 11, upper wall panel 14 is shown being decoupled from elevator car wall 12 and removed from its initial mounted position between lower wall 26 and elevator car wall 12. Finally, FIG. 12 depicts the elevator mounting assembly absent upper wall panel 14, which has now been completely removed, while ceiling panel 18 remains mounted in place to elevator car wall 12 by hanger 20.

Figure 13:
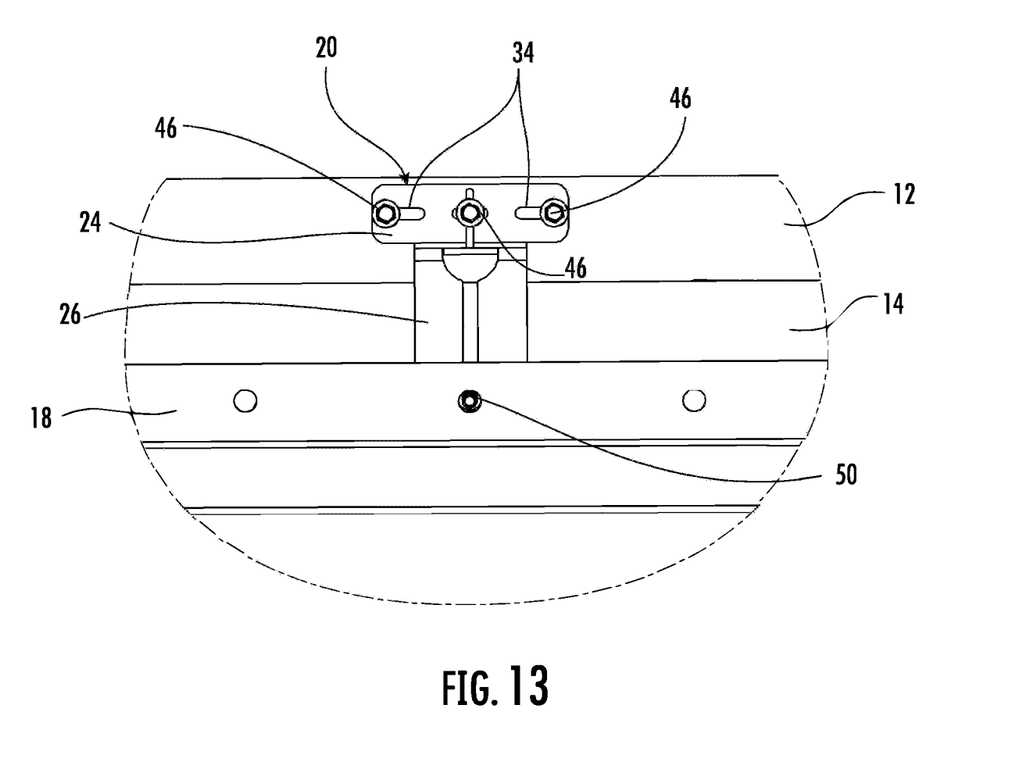
FIG. 13 is a detailed front view of an elevator mounting assembly, showing detail 13-13 of FIG. 8, according to an exemplary embodiment.

Referring to FIG. 13, section 13-13 of FIG. 8-8, specifically a front view of an elevator mounting assembly, is shown. FIG. 13 shows upper wall panel 14 coupled to elevator car wall 12 at a height vertically below the height at which upper wall 24 of hanger 20 is coupled to elevator car wall 12 by wall mounting fasteners 46. Further, lower wall 26 of hanger 20 is shown overhanging upper wall panel 14.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A side mount hanger, comprising:
   a first wall;
   a second wall extending in a first direction away from the first wall such that the second wall is oriented vertically to the first wall;
   a third wall spaced from the second wall and extending from the first wall in a second direction opposite the first direction such that the third wall is oriented vertically to the first wall;
   a ceiling mounting channel formed in the third wall and extending into the first wall; and
   a vertical mounting channel formed in the second wall and extending into the first wall, the vertical mounting channel spaced a distance from the ceiling mounting channel along the first wall.

2. The side mount hanger of claim 1, wherein the ceiling mounting channel is vertically oriented and configured to receive a ceiling mounting fastener coupled to an elevator ceiling panel.

3. The side mount hanger of claim 1, further comprising an upward opening arcuate wall segment that couples the second wall to the first wall and a downward facing arcuate wall segment that couples the third wall to the first wall.

4. The side mount hanger of claim 3, wherein the ceiling mounting channel extends from the third wall, through the downward facing arcuate segment and into the first wall.

5. The side mount hanger of claim 1, wherein the second wall comprises a wall mounting channel configured to receive a wall mounting fastener and to allow sliding of the wall mounting fastener with respect to the wall mounting channel when the second wall is mounted to an elevator car wall.

6. The side mount hanger of claim 5, wherein the wall mounting channel is horizontally oriented such that the wall mounting channel allows horizontal sliding of the wall mounting fastener with respect to the wall mounting channel when the second wall is mounted to the elevator car wall.

7. A side mount hanger, comprising:
   an upper wall;
   a lower wall positioned at a lower vertical height than the upper wall;
   an intermediate wall coupled to the upper wall and the lower wall, the intermediate wall extending between the upper wall and the lower wall;
   a horizontal mounting channel formed in the upper wall; and
   a vertical mounting channel formed in the upper wall and extending into the intermediate wall, the vertical mounting channel intersecting the horizontal mounting channel such that the vertical mounting channel and the horizontal mounting channel are configured to receive the same wall mounting fastener.

8. The side mount hanger of claim 7, wherein the horizontal mounting channel is horizontally centered with respect to the upper wall, and wherein the horizontal mounting channel horizontally bisects the vertical mounting channel.

9. The side mount hanger of claim 7, wherein the horizontal mounting channel is a plurality of horizontal mounting channels, and wherein the vertical mounting channel intersects at least one of the plurality of horizontal mounting channels.

10. The side mount hanger of claim 9, wherein each horizontal mounting channel has a horizontal length of ¼" to 1½".

11. The side mount hanger of claim 9, wherein the plurality of horizontal mounting channels comprises three horizontal mounting channels, and wherein the horizontal mounting channels are in horizontal alignment with one another.

12. The side mount hanger of claim 11, wherein the three horizontal mounting channels comprise two outer horizontal mounting channels and an inner horizontal mounting channel positioned horizontally between the two outer horizontal mounting channels, and wherein the vertical mounting channel intersects the inner horizontal mounting channel.

13. The side mount hanger of claim 7, further comprising a ceiling mounting channel formed in the lower wall extending into the intermediate wall.

14. The side mount hanger of claim 7, wherein the upper wall forms a first angle with the intermediate wall, wherein the lower wall forms a second angle with the intermediate wall, and wherein the first angle is 90 degrees.

15. The side mount hanger of claim 14, wherein the first angle and the second angle are equal.

16. An elevator mounting assembly, comprising:
   an elevator car wall having an upper wall panel and a lower wall panel;
   a hanger coupled to the elevator car wall, the hanger, comprising:
      a first wall having a first side and a second side;
      a second wall extending perpendicularly from the first side of the first wall, the second wall coupled to the upper wall panel at a location above the lower wall panel;
      a third wall extending perpendicularly from the second side of the first wall and spaced laterally from the elevator car wall;
      a first channel formed in the third wall and extending into the first wall; and
      a second channel formed in the second wall and extending into the first wall, the second channel spaced a distance from the first channel along the first wall; and
   an elevator ceiling panel coupled to the third wall.

17. The elevator mounting assembly of claim 16, further comprising a plurality of wall mounting fasteners that couple the second wall to the upper wall panel and a ceiling mounting fastener that couples the elevator ceiling panel to the third wall, wherein the plurality of wall mounting fasteners are slidable with respect to the second wall of the hanger.

18. The elevator mounting assembly of claim 17, wherein the second wall comprises a wall mounting channel configured to receive at least one of the plurality of wall mounting fasteners.

19. The elevator mounting assembly of claim 16, further comprising a security clip having an upper clip wall secured between the second wall of the hanger and the elevator car wall and a lower clip wall extending from the upper clip wall toward the third wall of the hanger.

20. The elevator mounting assembly of claim 16, wherein the third wall of the hanger is spaced laterally apart from the elevator car wall by approximately ¼" to 1½".

21. A side mount hanger, comprising:
   an upper wall;
   a lower wall positioned at a lower vertical height than the upper wall;
   an intermediate wall coupled to the upper wall and the lower wall, the intermediate wall extending between the upper wall and the lower wall;

a plurality of horizontal mounting channels formed in the upper wall; and a vertical mounting channel formed in the upper wall and extending into the intermediate wall, the vertical mounting channel intersecting at least one of the plurality of horizontal mounting channels such that the vertical mounting channel and the at least one horizontal mounting channel are configured to receive the same wall mounting fastener.

22. The side mount hanger of claim 21, wherein each horizontal mounting channel has a horizontal length of ¼" to 1½".

23. The side mount hanger of claim 21, wherein the plurality of horizontal mounting channels comprises three horizontal mounting channels, and wherein the horizontal mounting channels are in horizontal alignment with one another.

24. The side mount hanger of claim 23, wherein the three horizontal mounting channels comprise two outer horizontal mounting channels and an inner horizontal mounting channel positioned horizontally between the two outer horizontal mounting channels, and wherein the vertical mounting channel intersects the inner horizontal mounting channel.

25. An elevator mounting assembly, comprising:
an elevator car wall having an upper wall panel and a lower wall panel;
a hanger coupled to the elevator car wall, the hanger, comprising:
  a first wall having a first side and a second side;
  a second wall extending perpendicularly from the first side of the first wall, the second wall coupled to the upper wall panel at a location above the lower wall panel;
  a third wall extending perpendicularly from the second side of the first wall and spaced laterally from the elevator car wall; and
  a channel formed in the third wall and extending into the first wall;
an elevator ceiling panel coupled to the third wall;
a plurality of wall mounting fasteners that couple the second wall to the upper wall panel, wherein the plurality of wall mounting fasteners are slidable with respect to the second wall of the hanger; and
a ceiling mounting fastener that couples the elevator ceiling panel to the third wall.

26. The elevator mounting assembly of claim 25, wherein the second wall comprises a wall mounting channel configured to receive at least one of the plurality of wall mounting fasteners.

27. An elevator mounting assembly, comprising:
an elevator car wall having an upper wall panel and a lower wall panel;
a hanger coupled to the elevator car wall, the hanger, comprising:
  a first wall having a first side and a second side;
  a second wall extending perpendicularly from the first side of the first wall, the second wall coupled to the upper wall panel at a location above the lower wall panel;
  a third wall extending perpendicularly from the second side of the first wall and spaced laterally from the elevator car wall; and
  a channel formed in the third wall and extending into the first wall;
an elevator ceiling panel coupled to the third wall; and
a security clip having an upper clip wall secured between the second wall of the hanger and the elevator car wall and a lower clip wall extending from the upper clip wall toward the third wall of the hanger.

28. An elevator mounting assembly, comprising:
an elevator car wall having an upper wall panel and a lower wall panel;
a hanger coupled to the elevator car wall, the hanger, comprising:
  a first wall having a first side and a second side;
  a second wall extending perpendicularly from the first side of the first wall, the second wall coupled to the upper wall panel at a location above the lower wall panel;
  a third wall extending perpendicularly from the second side of the first wall and spaced laterally from the elevator car wall; and
  a channel formed in the third wall and extending into the first wall; and
an elevator ceiling panel coupled to the third wall;
wherein the third wall of the hanger is spaced laterally apart from the elevator wall panel by approximately ¼" to 1½".

* * * * *